United States Patent

Oguro

[11] Patent Number: 5,359,490
[45] Date of Patent: Oct. 25, 1994

[54] METHOD OF CONTROLLING MOVING ELEMENT OF MAGNETIC LEVITATION AND TRANSPORT SYSTEM

[75] Inventor: Ryuichi Oguro, Kitakyushu, Japan

[73] Assignee: Kabushiki Kaisha Yaskawa Denki Seisakusho, Kitakyushu, Japan

[21] Appl. No.: 139,886

[22] Filed: Oct. 22, 1993

Related U.S. Application Data

[63] Continuation of Ser. No. 684,920, Apr. 23, 1991, abandoned.

[30] Foreign Application Priority Data

Aug. 24, 1989 [JP] Japan .................. 1-215985

[51] Int. Cl.$^5$ .......................................... H02N 15/00
[52] U.S. Cl. ................................. 361/144; 361/146
[58] Field of Search ............... 156/DIG. 62; 104/281, 104/283, 284; 310/90, 90.5; 361/139, 143, 144, 146, 147, 159, 179, 182

[56] References Cited

U.S. PATENT DOCUMENTS

| | | | |
|---|---|---|---|
| 4,392,693 | 7/1983 | Habermann et al. | 310/90.5 |
| 4,629,262 | 12/1986 | Hamilton | 310/90.5 |
| 4,868,708 | 9/1989 | Bohn | 361/144 |
| 4,967,670 | 11/1990 | Morishita et al. | 104/284 |
| 4,999,534 | 3/1991 | Andrianos | 310/90.5 |
| 5,156,093 | 10/1992 | Azukizawa et al. | 104/284 |
| 5,157,296 | 10/1992 | Trumper | 310/90.5 |
| 5,160,877 | 11/1992 | Fujiwara et al. | 310/90.5 X |
| 5,168,183 | 12/1992 | Whitehead | 310/90.5 X |
| 5,208,522 | 5/1993 | Griepentrog et al. | 310/90.5 |
| 5,243,491 | 9/1993 | Van Eijk et al. | 361/144 |

FOREIGN PATENT DOCUMENTS

| | | |
|---|---|---|
| 2317643 | 10/1974 | Fed. Rep. of Germany . |
| 3143512 | 5/1983 | Fed. Rep. of Germany . |
| 55-79744 | 6/1980 | Japan . |
| 63-220702 | 9/1988 | Japan . |
| 63-308215 | 12/1988 | Japan . |
| 2179201 | 7/1990 | Japan . |

Primary Examiner—A. D. Pellinen
Assistant Examiner—Fritz M. Fleming
Attorney, Agent, or Firm—Oblon, Spivak, McClelland, Maier & Neustadt

[57] ABSTRACT

A magnetic levitation and transport system has a plate-like moving element (SFT) which is moved by a linear motor disposed in a stator (STT). The moving element is moved vertically by first through fourth electromagnetic devices ($MGV_{10}$–$MGV_{41}$), and fifth and sixth electromagnetic devices ($MGH_{10}$–$MGH_{21}$) exert forces on the moving element in a horizontal direction perpendicular to the direction in which the moving element is moved. Gaps between the moving element and the electromagnetic devices are detected by gap sensors which produce gap data. In the vertical direction, for example, attractive force commands ($f_{V1}$-$f_{V2}$) are produced from the outputs from a circuit for calculating the amount of feedback (10) which is supplied with the gap data ($XV_1$-$XV_4$) and also with the output from a variable gain $g_V(l)$ generator (60) to which the position (l) of the center of gravity of the moving element is supplied. The attractive force commands are then linearized by linearizing circuits (71-74), and linearized outputs are applied to the electromagnetic devices. With this arrangement, the variable gains can be established by an analog circuit, and control gains in the respective control directions can be given independently of each other.

3 Claims, 8 Drawing Sheets

METHOD OF CONTROLLING MOVING ELEMENT OF MAGNETIC LEVITATION AND TRANSPORT SYSTEM

This application is a continuation of application Ser. No. 07/684,920, filed on Apr. 23, 1991, now abandoned.

TECHNICAL FIELD

The present invention relates to a method of controlling a moving element propelled by a linear motor such that the moving element is held by electromagnets and controlled in attitude in a magnetic levitation and transport system.

BACKGROUND ART

Figure 6A:
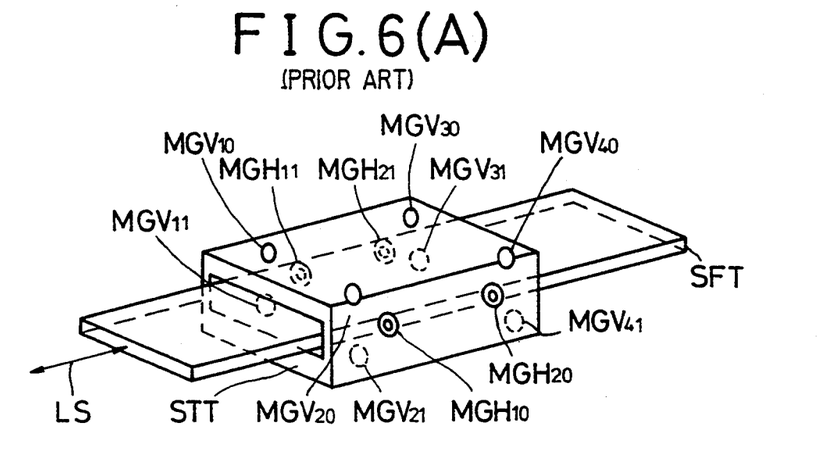
FIG. 6(A) is a perspective view of a conventional magnetic levitation and transport system.
Figure 6B:
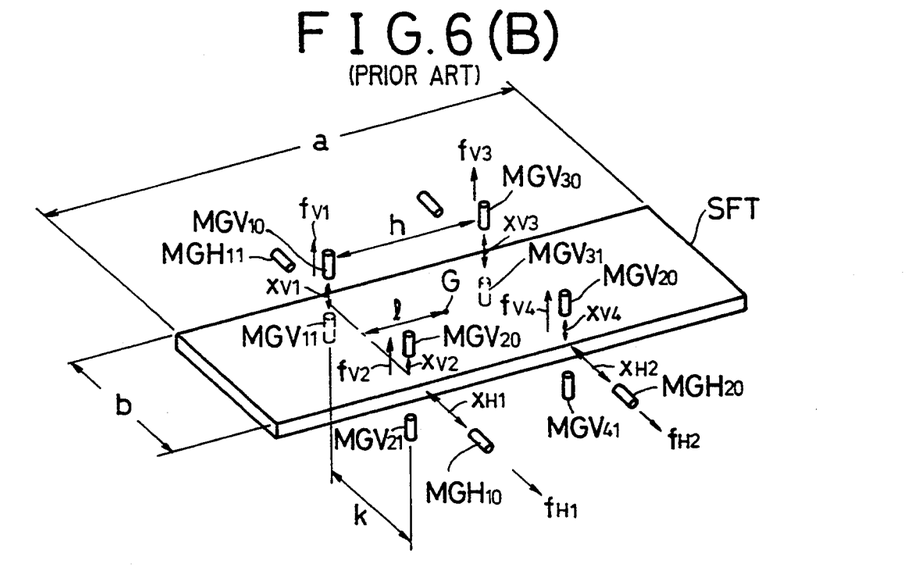
FIG. 6(B) is a perspective view showing in detail the positional relationship between a moving element and electromagnets shown in FIG. 6(A), and FIGS. 7(A), 7(B), ~, 7(E) are views showing the manner in which the moving element shown in FIG. 6(A) is controlled.
Figure 7A:
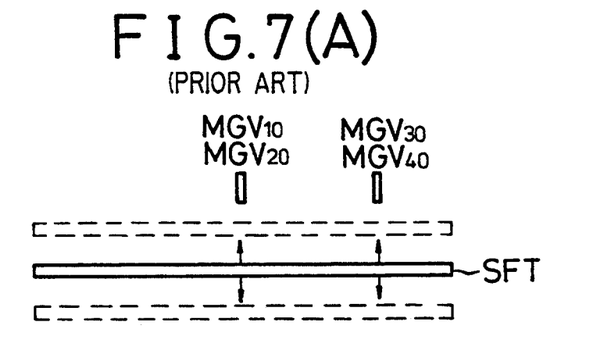
Figure 7B:
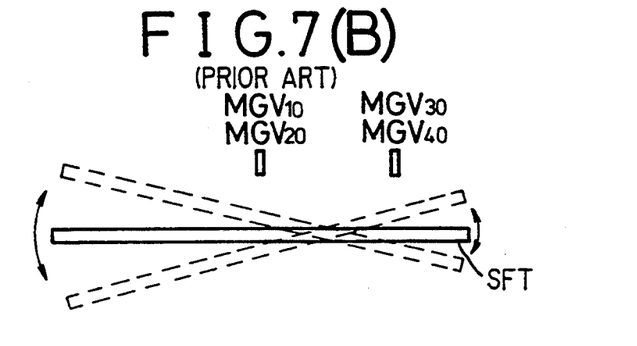
Figure 7C:
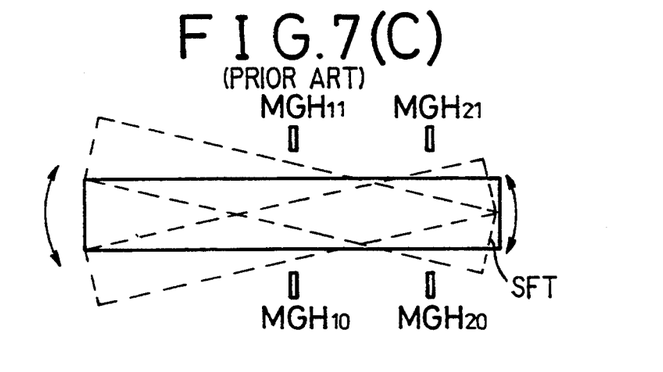
Figure 7D:
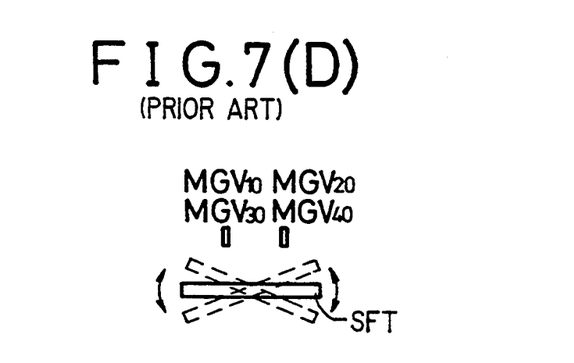
Figure 7E:
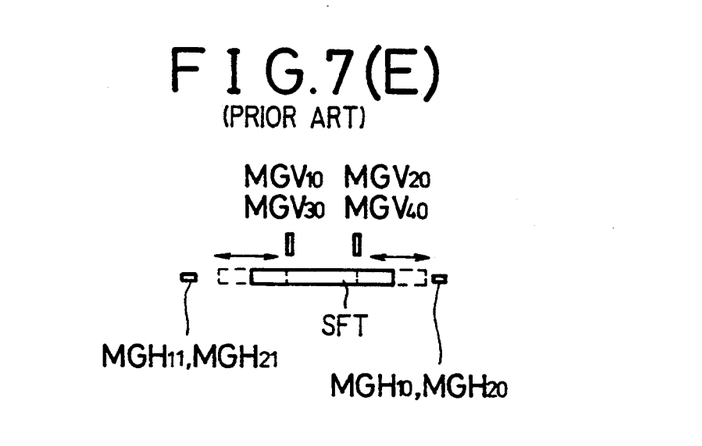

FIGS. 6(A) and 6(B) are views showing a conventional magnetic levitation and transport system. A moving element SFT having a mass m is propelled in a linear direction indicated by the arrow LS by a linear motor. A stator STT has eight electromagnets $MGV_{10}$, $MGV_{11}$, $\sim$, $MGV_{41}$ for generating attractive forces in a vertical direction to levitate the moving element in response to attractive force commands $f_{V1}$, $f_{V2}$, $f_{V3}$, $f_{V4}$ supplied through linearizing circuits, and four electromagnets $MGH_{10}$, $MGH_{11}$, $MGH_{20}$, $MGH_{21}$ for generating attractive forces in a horizontal direction to guide the moving element in response to attractive force commands $f_{H1}$, $f_{H2}$ supplied through linearizing circuits. The stator STT thus serves to hold the moving element SFT and control its attitude. The stator STT controls the moving element SFT in a levitating vertical direction, a pitching direction, a rolling direction, a guiding horizontal direction, and a yawing direction as shown in FIGS. 7(A), 7(B), $\sim$, 7(E) respectively. To control the moving element SFT, it has heretofore been customary to establish the commands $F_{V1}$, $F_{V2}$, $\sim$, $F_{H2}$ based on only data $X_{V1}$, $X_{V2}$, $\sim$, $X_{H2}$ regarding gaps between the electromagnets and the moving element. However, the conventional method has the following disadvantages:

i) It is impossible to give gains and commands independently for each of the three control directions with respect to levitation (vertical, pitching, and rolling directions) and each of the two control directions with respect to guidance (horizontal and yawing directions).

ii) The gains in the vertical and horizontal directions vary depending on the position l of the center G of gravity of the moving element relative to the line connecting magnets $MGH_{10}$ and $MGH_{11}$.

iii) Movements in the vertical and pitching directions and movements in the horizontal and yawing directions would interfere with each other unless l=h/2 (h is the distance between the electromagnets in the direction indicated by the arrow LS) on the moving element.

Japanese Patent Laid-Open No. Hei 2-179201 discloses a method of providing stable attitude control while overcoming the above drawbacks. However, although the disclosed control method solves the problems i), ii), and iii) pointed out above, it is disadvantageous in that variable gains in a control system cannot easily be established by an analog circuit.

DISCLOSURE OF THE INVENTION

In view of the aforesaid drawbacks, it is an object of the present invention to provide a method of controlling a moving element of a magnetic levitation and transport system which allows variable gains to be easily established by an analog circuit.

Another object of the present invention is to provide a method of controlling a moving element of a magnetic levitation and transport system, which allows control gains in the respective control directions to be given independently so that responses and damping constants in the respective control directions can be designed as desired.

Still another object of the present invention is to provide a method of controlling a moving element of a magnetic levitation and transport system which allows commands in the respective control directions to be given independently so that the moving element can be controlled independently in the five control directions for levitation and guidance.

According to the present invention, there is provided a method of controlling a moving element of a magnetic levitation and transport system wherein when a rectangular plate-like moving element is moved in a linear direction by a linear motor disposed in a stator, the moving element is vertically supported at supporting points corresponding to positions in which first, second, third, and fourth electromagnetic devices are disposed at the corners of a horizontal rectangle in the stator, forces are applied to the moving element by a fifth and sixth electromagnetic device which are disposed in a horizontal plane along the direction in which the moving element is moved and in a direction perpendicular to the direction in which the vertically supported moving element is moved and gaps between the moving element and the electromagnetic devices are detected by gap sensors associated with the respective electromagnetic devices for outputting first, second, third fourth, fifth, and sixth gap data ($X_{V1}$, $X_{V2}$, $X_{V3}$, $X_{V4}$, $X_{H1}$, $X_{H2}$), respectively whereby the moving element is moved while supporting the moving element in a desired state based on the gap data and the position (l) of the center of gravity of the moving element relative to the line connecting magnets $MGH_{10}$ and $MGH_{11}$ in a linear direction, characterized in that attractive force commands $f_{V1}$ and $f_{V2}$, which are applied through linearizing circuits to the first and second electromagnetic devices to exert forces on the moving element, are expressed by:

$$f_{Vi} = -g_V(l)K_{VV}U_V(X_{rV}, \vec{X_V}) - K_{VP}U_P(X_{rP}, \vec{X_p}) + (-1)^i K_{VR} U_R(X_{rR}, \vec{X_R})$$

where i=1, 2, attractive force commands $f_{V3}$ and $f_{V4}$, which are applied through linearizing circuits to the third and fourth electromagnet devices to exert forces on the moving element, are expressed by:

$$f_{Vi} = -g_V(l)K_{VV}U_V(X_{rV}, \vec{X_V}) + K_{VP}U_P(X_{rP}, \vec{X_p})$$

where i=3, 4, attractive force commands $f_{H1}$ and $f_{H2}$, which are applied through linearizing circuits to the fifth and sixth electromagnetic devices to exert forces on the moving element, are expressed by:

$$f_{H1} = -g_H(l)K_{VH}U_H(X_{rH}, \vec{X_H}) - \vec{K_{YY}}U_Y(X_{rY}, \vec{X_y})$$

$$f_{H2} = -g_H(l)K_{VH}U_H(X_{rH}, \vec{X_H}) + \vec{K_{YY}}U_Y(X_{rY}, \vec{X_Y})$$

where $\vec{X}$ is a vector quantity whose parameters are $\int Xdl$, $X$, $\dot{X}$, $\ddot{X}$ (suffixes of X are omitted), where $$X_V = \tfrac{1}{4}(X_{V1} + X_{V2} + X_{V3} + X_{V4}),$$

$$X_P = \tfrac{1}{2}(X_{V1}+X_{V2}-X_{V3}-X_{V4}),$$

$$X_R = (X_{V1}-X_{V2}),$$

$$X_H = \tfrac{1}{2}(X_{H1}+X_{H2}),$$

$$X_Y = X_{H1}-X_{H2},$$

$Xr$ (suffixes following r are omitted) is a command value, and $g_V(l)$ and $g_H(l)$ are variable gains.

BEST MODE FOR CARRYING OUT THE INVENTION

In a method of controlling a moving element of a magnetic levitation and transport system according to an embodiment of the present invention, forces generated by the respective electromagnetic devices are composed of mutually independent components for each direction of movement, and the variable gains are combined for the separate control of the levitating and guiding directions.

The method according to the embodiment of the present invention, which is an improvement of the conventional method, controls the object as shown in FIGS. 6(A) and 6(B) by proportional control.

Figure 2:
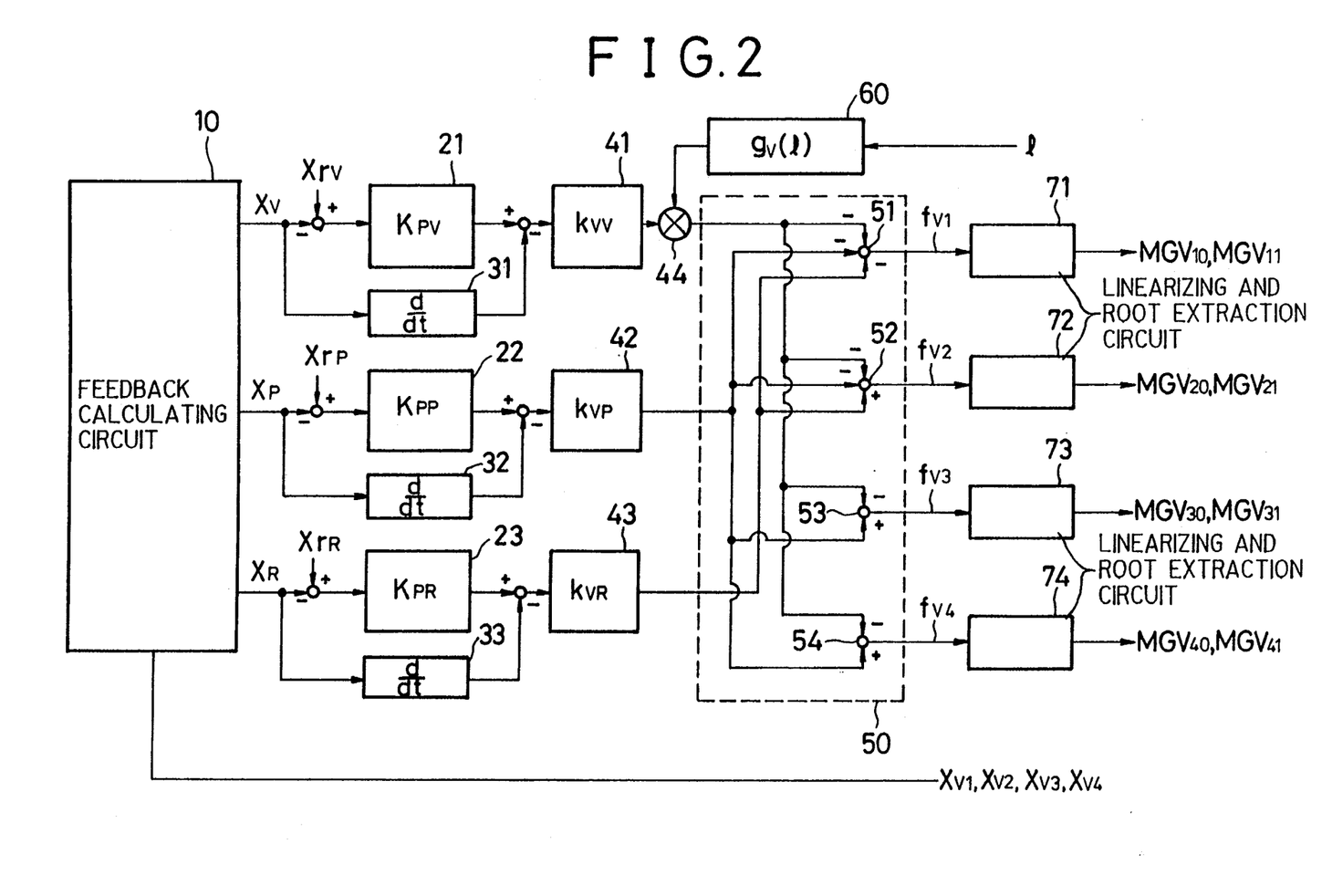
FIG. 2 is a block diagram of a control circuit for carrying out the method of the present invention.

An attractive force command $f_{V1}$ applied to a linearizing circuit 71 to cause electromagnets $MGV_{10}$ and $MGV_{11}$ to generate attractive forces, and an attractive force command $f_{V2}$ applied to a linearizing circuit 72 to cause electromagnets $MGV_{20}$ and $MGV_{21}$ to generate attractive forces, are expressed by the equation (1) (where i=1, 2):

$$f_{Vi} = -g_V(l) \cdot K_{VV}\left\{ K_{PV}(X_{rV} - X_V) + \tfrac{d}{dt}(-X_V) \right\} - \quad (1)$$

$$K_{VP}\left\{ K_{PP}(X_{rP} - X_P) + \tfrac{d}{dt}(-X_P) \right\} +$$

$$(-1)^i K_{VR}\left\{ K_{PR}(X_{rR} - X_R) + \tfrac{d}{dt}(-X_R) \right\}.$$

An attractive force command $f_{V3}$ applied to a linearizing circuit 73 to cause electromagnets $MGV_{30}$ and $MGV_{31}$ to generate attractive forces, and an attractive force command $f_{V4}$ applied to a linearizing circuit 74 to cause electromagnets $MGV_{40}$ and $MGV_{41}$ to generate attractive forces, are expressed by the equation (2) (where i=3, 4):

$$f_{Vi} = -g_V(l) \cdot K_{VV}\left\{ K_{PV}(X_{rV} - X_V) + \tfrac{d}{dt}(-X_V) \right\} + \quad (2)$$

$$K_{VP}\left\{ K_{PP}(X_{rP} - X_P) + \tfrac{d}{dt}(-X_P) \right\}.$$

Figure 3:
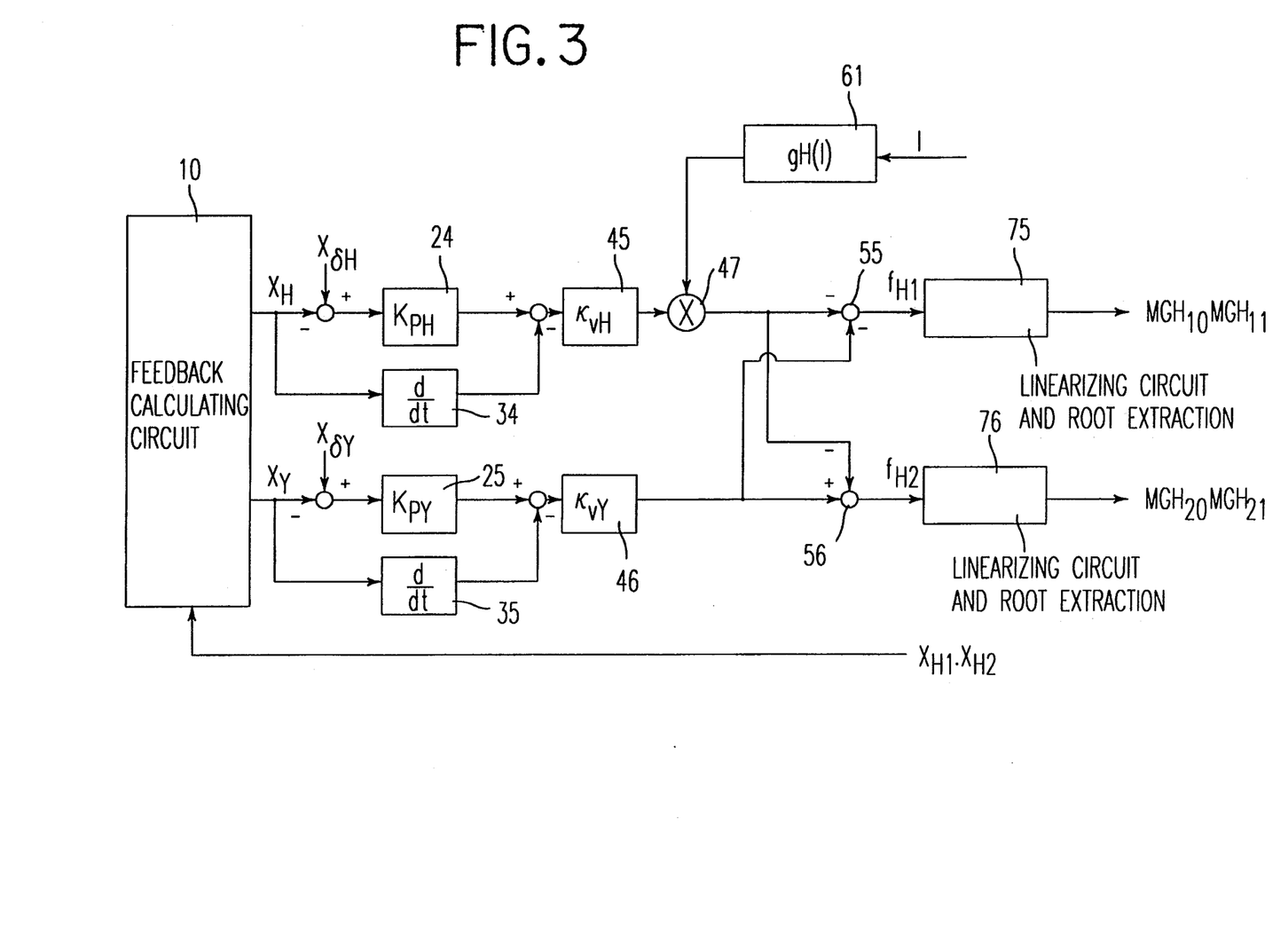
FIG. 3 is a block diagram of a control circuit for carrying out the method of the present invention.

As shown in FIG. 3, an attractive force command $f_{H1}$ applied to a linearizing circuit 75 to cause electromagnets $MGH_{10}$ and $MGH_{11}$ to generate attractive forces, and an attractive force command $f_{H2}$ applied to a linearizing circuit 76 to cause electromagnets $MGH_{20}$ and $MGH_{21}$ to generate attractive forces, are expressed by the respective equations (3), (4):

$$f_{H1} = -g_H(l) \cdot K_{VH}\left\{ K_{PH}(X_{rH} - X_H) + \tfrac{d}{dt}(-X_H) \right\} - \quad (3)$$

$$K_{VY}\left\{ K_{PY}(X_{rY} - X_Y) + \tfrac{d}{dt}(-X_Y) \right\}$$

$$f_{H2} = -g_H(l) \cdot K_{VH}\left\{ K_{PH}(X_{rH} - X_H) + \tfrac{d}{dt}(-X_H) \right\} + \quad (4)$$

$$K_{VY}\left\{ K_{PY}(X_{rY} - X_Y) + \tfrac{d}{dt}(-X_Y) \right\}$$

where $$X_V = \tfrac{1}{4}(X_{V1}+X_{V2}+X_{V3}+X_{V4}),$$

$$X_P = \tfrac{1}{4}(X_{V1}+X_{V2}-X_{V3}-X_{V4}),$$

$$X_R = (X_{V1}-X_{V2}),$$

$$X_H = \tfrac{1}{2}(X_{H1}+X_{H2}),$$

$$X_Y = X_{H1}-X_{H2}.$$

If gravity is compensated for by a gravity compensating circuit (not shown), the equations of state are given as follows:

$$\tfrac{d^2}{dt^2} X_V = \tfrac{4I_P + 4ml^2 - 4mhl + mh^2}{I_{pm}} K_T k_{VV} g_V(l) \cdot \quad (5)$$

$$\left\{ K_{PV}(X_{rV} - X_V) + \tfrac{d}{dt}(-X_V) \right\}$$

$$\tfrac{d^2}{dt^2} X_P = \tfrac{2h^2}{I_P} K_T k_{VP}\left\{ K_{PP}(X_{rP} - X_P) + \tfrac{d}{dt}(-X_P) \right\} \quad (6)$$

-continued $$\frac{d^2}{dt^2} X_R = \tag{7}$$

$$\frac{k^2}{I_R} K_T k_{VR} \left\{ K_{PR}(X_{rR} - X_R) + \frac{d}{dt}(-X_R) \right\}$$

$$\frac{d^2}{dt^2} X_H = \frac{4I_Y + 4ml^2 - 4mhl + mh^2}{2I_Y m} K_T k_{VH} g_H(l) \cdot \tag{8}$$

$$\left\{ K_{PH}(X_{rH} - X_H) + \frac{d}{dt}(-X_H) \right\}$$

$$\frac{d^2}{dt^2} X_Y = \tag{9}$$

$$\frac{h^2}{I_P} K_T k_{VY} \left\{ K_{PY}(X_{rY} - X_Y) + \frac{d}{dt}(-X_Y) \right\}$$

where $K_T$ = DC gain of electromagnetic attractive forces in response to an attractive force command,
m = mass of the moving element,
$I_P$ = moment of inertia in the pitching direction around the center of gravity of the moving element,
$I_R$ = moment of inertia in the rolling direction around the center of gravity of the moving element,
$I_Y$ = moment of inertia in the yawing direction around the center of gravity of the moving element,
$K_T k_{VV} = K_{VV}$, $K_T k_{VP} = K_{VP}$, $K_T k_{VR} = K_{VR}$,
$K_T k_{VH} = K_{VH}$, $K_T k_{VY} = K_{VY}$.

Speed loop gains in the levitating and guiding directions and position loop gains are given for the respective diretions as follows:

The speed loop gain in the levitating vertical direction ($K_{VV} = K_T \cdot k_{VV}$):

$$\frac{4I_P + 4ml^2 - 4mhl + mh^2}{I_P m} K_{Tg_V(l)} \cdot k_{VV}$$

The position loop gain: $K_{PV}$

The pitching direction, speed loop gain ($K_{VP} = K_T \cdot k_{VP}$):

$$\frac{2h^2}{I_P} K_T k_{VP}$$

The position loop gain: $K_{PP}$

The rolling direction, speed loop gain ($K_{VR} = K_T \cdot k_{VR}$):

$$\frac{k^2}{I_P} K_T k_{VR}$$

The position loop gain: $K_{PR}$

The speed loop gain in the guiding horizontal direction ($K_{VH} = K_T \cdot k_{VH}$):

$$\frac{4I_Y + 4ml^2 - 4mhl + mh^2}{I_Y m} K_{Tg_H(l)} \cdot k_{VH}$$

The position loop gain: $K_{PH}$

The speed loop gain in the yawing direction ($K_{VY} = K_T \cdot k_{VY}$):

$$\frac{h^2}{I_P} K_T k_{VY}$$

The position loop gain: $K_{PY}$

Since the parameters $k_{VV}$, $k_{VP}$, $k_{VR}$, $k_{VH}$, $k_{VY}$, $K_{PV}$, $K_{PP}$, $K_{PR}$, $K_{PH}$, $K_{PY}$ can be freely established, the speed loop gains and the position loop gains can be established as desired by adjusting these parameters.

$g_V(l)$, $g_H(l)$ may be given respectively in order to compensate for a gain variation of:

$$\frac{4I_P + 4ml^2 - 4mhl + mh^2}{I_P m}, \frac{4I_Y + 4ml^2 - 4mhl + mh^2}{2I_Y m}$$

Figure 1A:
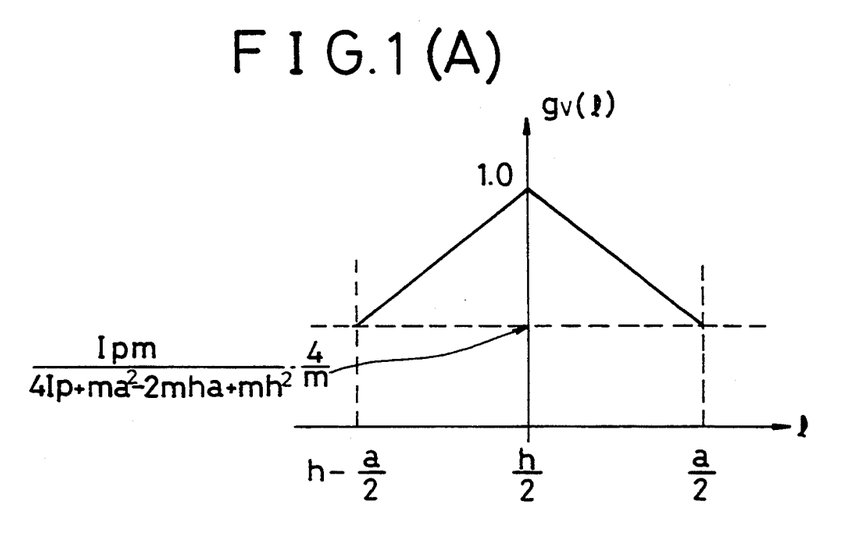
FIGS. 1(A) and 1(B) are diagrams showing gains $g_V(l)$ and $g_H(l)$ given by a method of controlling a moving element of a magnetic levitation and transport system according to an embodiment of the present invention.
Figure 1B:
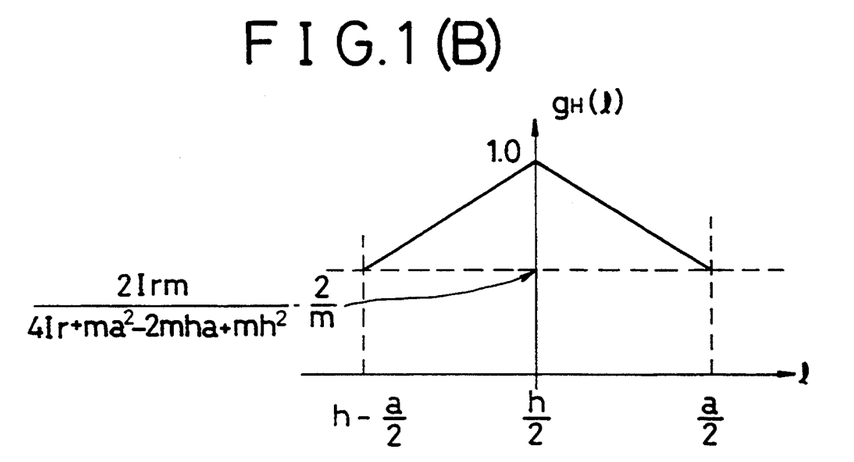

In this embodiment, the gain variation is linearly compensated for as shown in FIGS. 1(A) and 1(B) for the sake of brevity. In this case, $g_V(l)$ and $g_H(l)$ are represented by two linear or straight lines and have a maximum value of 1 when $l = h/2$ and respective minimum values of:

$$\frac{I_P m}{4I_P + ma^2 - 2mha + mh^2} \cdot \frac{4}{m}, \frac{2I_Y m}{4I_Y + ma^2 - 2mha + mh^2} \cdot \frac{2}{m}$$

when $l = a/2$ or $l = h - (a/2)$.

A control circuit for carrying out the method according to the embodiment of the present invention will be described below with reference to FIG. 2.

A circuit for calculating the amount of feed back (10) calculates outputs $X_V$, $X_p$, $X_R$ from the gap data $X_{V1}$, $X_{V2}$, $X_{V3}$, $X_{V4}$.

A gain $K_{pV}$ multiplier 21 multiplies the difference which is produced by subtracting $X_V$ from a command value $X_{rV}$, by $K_{pV}$. A gain $k_{VV}$ multiplier 41 multiplies the difference which is produced by subtracting the output of a differentiator 31 that differentiates $X_V$ from the output of the gain $K_{PV}$ multiplier 21, by $k_{VV}$. A $g_V(l)$ generator 60 produces a varaible gain $g_V(l)$ depending on the position l of the center of gravity of the moving element relative to the line connecting magnets $MGH_{10}$ and $MGH_{11}$. A multiplier 44 multiplies the output of the gain $k_{VV}$ multiplier 41 by $g_V(l)$.

A gain $K_{pp}$ multiplier 22 multiplies the difference which is produced by subtracting $X_p$ from a command value $X_{rp}$, by $K_{pp}$. A gain $k_{Vp}$ multiplier 42 multiplies the difference which is produced by subtracting the output of a differentiator 32 that differentiates $X_P$ from the output of the gain $K_{pp}$ multiplier 22, by $k_{VP}$.

A gain $K_{PR}$ multiplier 23 multiplies the difference which is produced by subtracting $X_R$ from a command value $X_{rR}$, by $K_{PR}$. A gain $k_{VR}$ multiplier 43 multiplies the difference which is produced by subtracting the output of a differentiator 33 that differentiates $X_R$ from the output of the gain $K_{PR}$ multiplier 23, by $k_{VR}$.

A distributor 50 has calculating units 51, 52, 53, 54. Calculating unit 51 adds the output of the multiplier 44, the output of the gain $k_{VP}$ multiplier 42, and the output of the gain $k_{VR}$ multiplier 43, and outputs the sum with an inverted sign as the attractive force command $f_{V1}$. Calculating unit 52 subtracts the output of the gain $k_{VP}$ multiplier 42 and the output of the multiplier 44 from the output of the gain $k_{VR}$ multiplier 43, and outputs the difference as the attractive force command $f_{V2}$. Calculating unit 53 substracts the output of the multiplier 44 from the output of the gain $k_{VR}$ multiplier 42, and outputs the difference as the attractive force command $f_{V3}$. Calculating unit 54 subtracts the output of the multiplier 44 from the output of the gain $k_{VP}$ multiplier 42, and outputs the difference as the attractive force command $f_{V4}$.

The linearizing-circuits 71, 72, 73, 74 linearize the attractive force commands $f_{V1}$, $f_{V2}$, $f_{V3}$, $f_{V3}$, $f_{V4}$, respectively, and apply the linearized commands to the electromagnets MGV$_{10}$–MGV$_{41}$. The linearizing circuits will be described below.

The attractive force produced by an electromagnetic device is nonlinear and is proportional to the square of a supplied current and inversely proportional to the square of the gap data $X_{Vi}$ (i=1–4), $X_{Hj}$ (j=1, 2). The linearizing circuits serve to correct the nonlinearity of the attractive forces. The linearizing circuits determine the square roots ($\sqrt{}$) of the attractive force commands $f_{Vi}$ (i=1, 2, 3, 4), $f_{Hj}$ (j=1, 2) given as currents, and multiply the square roots by the gap data $X_{Vi}$, $X_{Hj}$.

As shown in FIG. 3, a gain $K_{PH}$ multiplier 24 multiplies the difference which is produced by subtracting $X_H$ from a command value $X_{YH}$, by $K_{PH}$. A gain $k_{VH}$ multiplier 45 multiplies the difference which is output by subtracting the output of a differentiator 34 that differentiates $X_H$ from the output of the gain $K_{PH}$ multiplier 24, by $k_{VH}$. A $g_{H(l)}$ generator 61 produces a variable gain $g_{H(l)}$ depending on the position l of the center of gravity of the moving element. A multiplier 47 multiplies the output of the gain $k_{VH}$ multiplier 45 by $g_{H(l)}$. A gain $K_{PY}$ multiplier 25 multiplies the difference which is produced by subtracting $X_Y$ from a command value $X_{VY}$, by $K_{PY}$. A gain $k_{VY}$ multiplier 46 multiplies the difference which is produced by subtracting the output of a differentiator 35 that diffenetiates $X_Y$ from the output of the gain $K_{PY}$ multiplier 25, by $k_{VY}$.

A distributor is formed of calculating units 55, 56. Calculating unit 55 adds the output of the multiplier 47 and the output of the gain $k_{VY}$ multiplier 46, and outputs the sum with an inverted sign as an attractive force command $f_{H1}$. Calculating unit 56 subtracts the output of the multiplier 47 from the output of the gain $k_{VY}$ multiplier 46, and outputs the difference as an attractive force command $f_{H2}$.

the linearizing circuits 75, 76 linearize the attractive force commands $f_{H1}$, $f_{H2}$, respectively, and apply the linearized commands to the electromagnets HGH$_{10}$–MGH$_{21}$.

In this way, the device disclosed in FIG. 3 of the present specification has the same operation as the device disclosed in FIG. 2, except with determining the linearized commands for electromagnetic MGH$_{10}$, MGH$_{11}$, MGH$_{20}$ and MGH$_{21}$. The speed loop gains in the respective control directions and the position loop gains described above govern the stability of the control system. With respect to the leviating vertical direction, for example, the variable gain $g_V(l)$ suppresses variations of the l-dependent term:

$$\frac{4I_P + 4ml^2 - 4mhl + mh^2}{I_{pm}},$$

thus minimizing variations in the speed loop gain due to movement of the moving element in a lienar direction.

The control circuit according to the embodiment successively gives $X_V$, $X_P$ and $X_R$ expressed by the equations (5), (6) and (7) to activate the electromagnets MGV$_{10}$, MGV$_{11}$, ~, MGV$_{41}$.

The results of various experiments conducted on the embodiment are given below.

The experiments were carried out under the following conditions:
 a : b : h : k=20: 3: 5 : 2,
 l=a/2,
 Each speed loop gain: 200,
 Each position loop gain: 100.

Figure 4A:
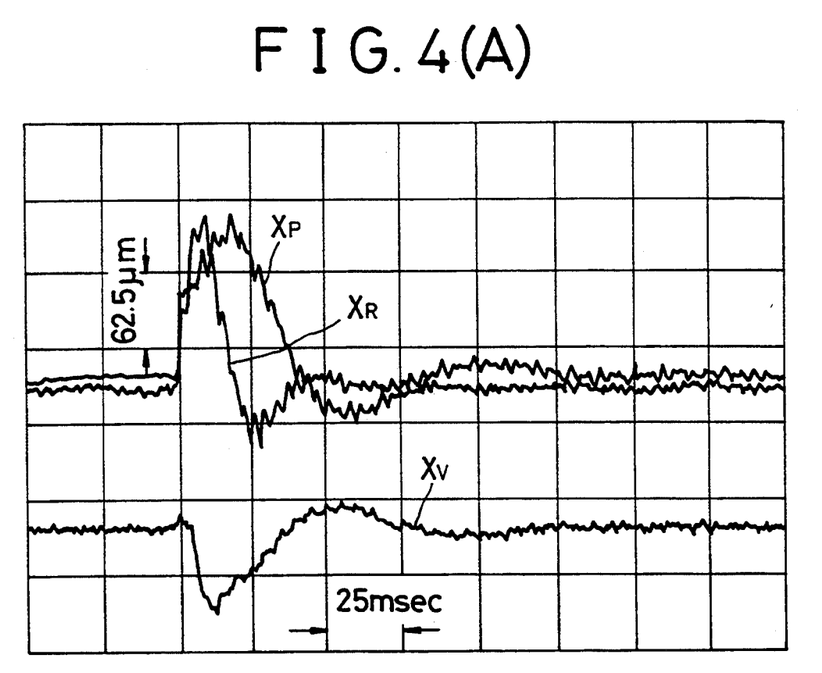
FIGS. 4(A) and 4(B) are graphs showing the difference between responses to disturbance according to the method of the embodiment and a conventional method.
Figure 4B:
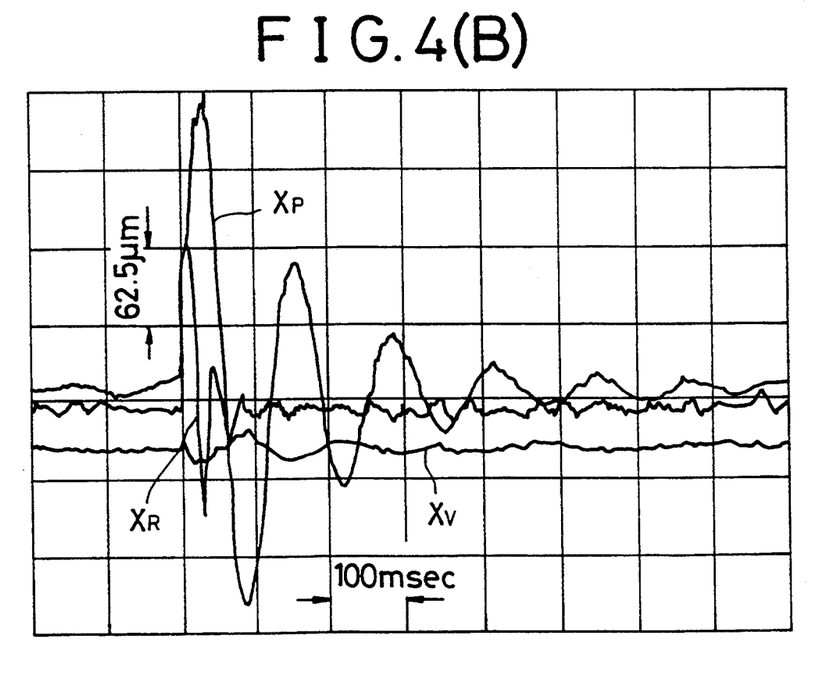

FIG. 4(A) shows a response to a disturbance according to the embodiment and FIG. 4(B) shows a response to this distrubance according to a conventional method. Since the levitating and guiding systems have basically the same characteristics, the levitating systems were tested. It can be seen that stability is much higher in the system according to the present embodiment.

Figure 5A:
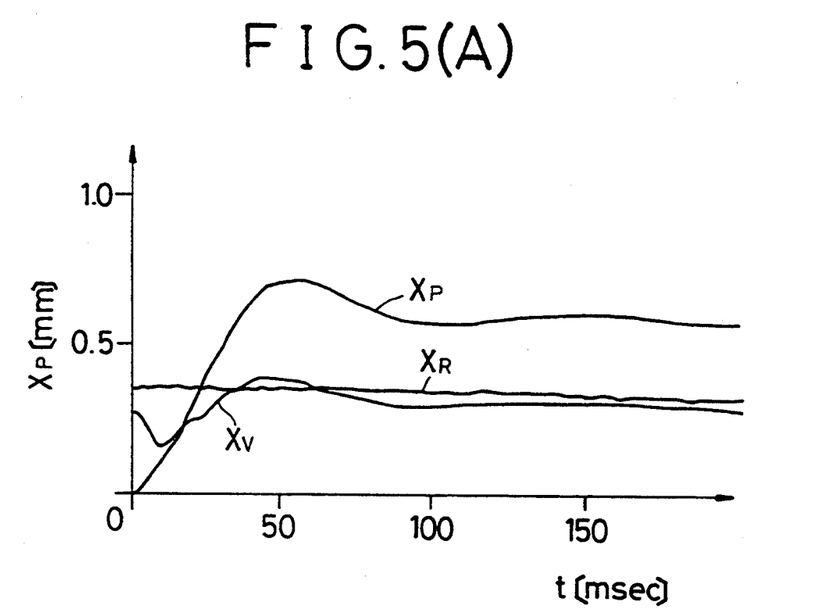
FIGS. 5(A) and 5(B) are graphs showing examples in which a moving element is controlled by the method of the embodiment.
Figure 5B:
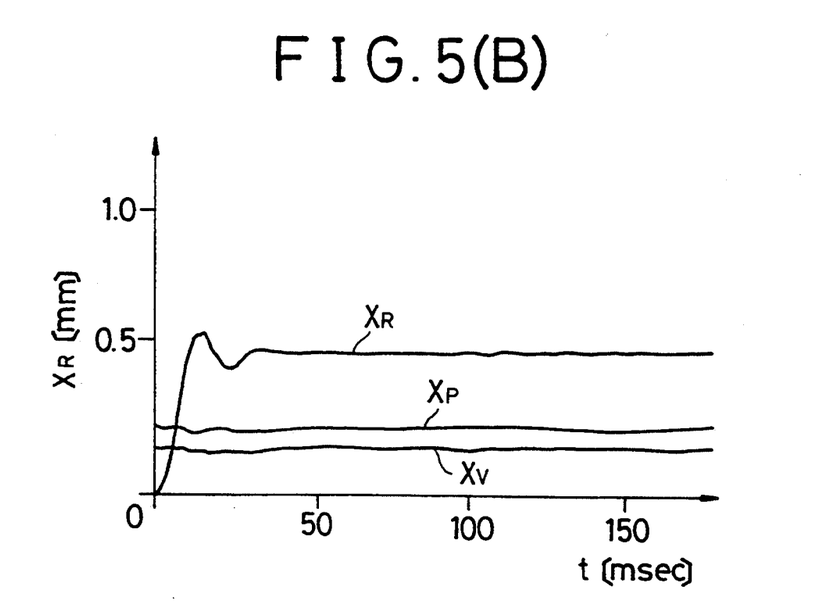

FIGS. 5(A) and 5(B) show the manner in which the moving element is controlled independently in the pitching and rolling directions. Pitching and rolling commands are given stepwise.

With the present invention, as described above, since the control gains in the respetive control directions are independently variable, the control gains can be given independently of each other so that the responses and damping constants in the respective control directions can be designed as desired. Inasmuch as the commands can be given independently for the respective control directions, the five axes for levitation and guidance can be actuated independently (see FIGS. 7(A) through 7(E), FIGS. 4(A) and 4(B), and FIG. 5(A) and 5(B)). The variable gains in the levitating vertical direction and the guiding horizontal direction are effective to suppress variations in the speed loop gains due to movement of the moving element.

Since the variable gains are provided for both the levitating and guiding directions, the method of the present invention can be carried out more easily than the conventional method and can be effected by an analog arrangement. If the pitching or yawing of the moving element is varied when l=a/2, a/2=h, the tip end of the moving element moves to a large extent, making it easy to transfer an object onto or from the moving element.

I claim:

1. A method of controlling a moving element of a magnetic levitation and transport system wherein when a rectangular plate-like moving element is moved in a linear direction by a linear motor disposed in a stator, the moving element is vertically supported at supporting points corresponding to positions in which first, second, third, and fourth pairs of electromagnetic devices are disposed at the corners of a horizontal rectangle in the state, force are applied to the moving element by a fifth and sixth pair of electromagnetic devices which are disposed in a horizontal plane along the direction in which the moving element is moved and in a direction perpendicular to the direction in which the vertically supported moving element is moved and gaps between the moving element and the electromagnetic devices are detected by gap sensors associated with the respective electromagnetic devices for outputting first, second, third, fourth, fifth, and sixth gap data ($X_{V1}$, $X_{V2}$, $X_{V3}$, $X_{V4}$, $X_{H1}$, $X_{H2}$), respectively, whereby the moving element is moved while supporting the moving element in a desired state based on the gap data and the position (l) of the center of gravity of the moving element in a linear direction, wherein, attractive force commands $f_{V1}$ and $f_{V2}$ which are applied through linearizing circuits to the first and second pair of electromagnetic devices to exert forces on the moving element are expressed by:

$$f_{Vi} = -g_V(l) \cdot K_{VV}\left\{ K_{PV}(X_{rV} - X_V) + \frac{d}{dt}(-X_V) \right\} -$$

$$K_{VP}\left\{ K_{PP}(X_{rP} - X_P) + \frac{d}{dt}(-X_P) \right\} +$$

$$(-1)^i K_{VR}\left\{ K_{PR}(X_{rR} - X_R) + \frac{d}{dt}(-X_R) \right\}$$

where i = 1, 2, attractive force commands $f_{V3}$ and $f_{V4}$ which are applied through linearizing circuits to the third and fourth pair of electromagnetic devices to exert forces on the moving element are expressed by;

$$f_{Vi} = -g_V(l) \cdot K_{VV}\left\{ K_{PV}(X_{rV} - X_V) + \frac{d}{dt}(-X_V) \right\} +$$

$$K_{VP}\left\{ K_{PP}(X_{rP} - X_P) + \frac{d}{dt}(-X_P) \right\}$$

where i = 3, 4, attractive force commands $f_{H1}$ and $f_{H2}$ which are applied through linearizing circuits to the fifth and sixth pair of electromagnetic devices to exert forces on the moving element are expressed by:

$$f_{H1} = -g_H(l) \cdot K_{VH}\left\{ K_{PH}(X_{rH} - X_H) + \frac{d}{dt}(-X_H) \right\} -$$

$$K_{VY}\left\{ K_{PY}(X_{rY} - X_Y) + \frac{d}{dt}(-X_Y) \right\}$$

$$f_{H2} = -g_H(l) \cdot K_{VH}\left\{ K_{PH}(X_{rH} - X_H) + \frac{d}{dt}(-X_H) \right\} +$$

$$K_{VY}\left\{ K_{PY}(X_{rY} - X_Y) + \frac{d}{dt}(-X_Y) \right\}$$

where
$X_V = \frac{1}{4}(X_{V1} + X_{V2} + X_{V3} + X_{V4})$,
$X_P = \frac{1}{2}(X_{V1} + X_{V2} = X_{V3} - X_{V4})$,
$X_R = (X_{V1} = X_{V2})$,
$X_H = \frac{1}{2}(X_{H1} + X_{N2})$,
$X_Y = X_{H1} - X_{H2}$,
Xr (suffixes following r are omitted) is a command value,
$K_{VV}$, $K_{VP}$, $K_{VR}$, $K_{PV}$, $K_{pp}$, $K_{PR}$, $K_{VH}$, $K_{PH}$, $K_{VY}$, $K_{PY}$ are predetermined gains, and
$g_V(l)$ and $g_H(l)$ are variable gains.

2. A method according to claim 1, wherein the variable gains $g_V(l)$ and $g_H(l)$ linearly decrease in proportion to the distance by which the position of the center of gravity of the moving element moves in the lienar direction away from a central position which is equidistant from the first, second, third, and fourth pair of electromagnetic devices.

3. A method according to claim either of claims 1 or 2, wherein said linearizing circuits determine the square roots of the attractive force commands given thereto, multiply the determined square roots by the gap data corresponding to the attractive force commands and output the products to the electromagnetic devices.

* * * * *

UNITED STATES PATENT AND TRADEMARK OFFICE
CERTIFICATE OF CORRECTION

PATENT NO. : 5,359,490
DATED : October 25, 1994
INVENTOR(S) : Ryuichi OGURO

It is certified that error appears in the above-indentified patent and that said Letters Patent is hereby corrected as shown below:

On the title page, Item [63], the Related U.S. Application Data is listed incorrectly. It should read:

--Continuation of Ser. No. 684,920, Apr. 23, 1991, filed as PCT/JP90/01074, Aug. 23, 1990, abandoned.--

Signed and Sealed this

Twenty-first Day of March, 1995

Attest:

BRUCE LEHMAN

*Attesting Officer*          Commissioner of Patents and Trademarks